United States Patent [19]

Kahn

[11] Patent Number: 5,046,139
[45] Date of Patent: Sep. 3, 1991

[54] OPTICAL RECEIVER FOR SUBCARRIER FREQUENCY DIVISION MULTIPLEXING SIGNALS

[75] Inventor: David A. Kahn, Nepean, Canada

[73] Assignee: Northern Telecom Limited, Montreal, Canada

[21] Appl. No.: 545,446

[22] Filed: Jun. 28, 1990

[51] Int. Cl.$^5$ .............................................. H04B 10/00
[52] U.S. Cl. ............................... 359/124; 250/214 A; 330/59; 359/195
[58] Field of Search ................. 455/619, 612, 617, 80; 250/214 A; 330/59, 308, 277; 370/3; 333/35, 206, 207

[56] References Cited

U.S. PATENT DOCUMENTS

| | | | |
|---|---|---|---|
| 4,075,576 | 2/1978 | Eden | 330/277 |
| 4,498,197 | 2/1985 | Chown | 250/214 R |
| 4,744,105 | 5/1988 | Kasper | 455/619 |
| 4,893,300 | 1/1990 | Carlin et al. | 370/3 |

OTHER PUBLICATIONS

Patent Abstracts of Japan, vol. 12, No. 187 (E-265)(3034) May 1988, & JP-A-62 290205 (NEC Corp) Dec. 17, 1987.

Primary Examiner—Reinhard J. Eisenzopf
Assistant Examiner—Kinfe-Michael Negash
Attorney, Agent, or Firm—Dallas F. Smith

[57] ABSTRACT

The optical receiver includes a photodiode, a preamplifier and a length of transmission line. The photodiode may be connected to the preamplifier, either via the transmission line, or directly between the preamplifier and the transmission line, that is, the transmission line is connected as an open circuit. The transmission line 14 may comprise a coaxial cable, stripline, or any other suitable form of transmission line. The input impedance of the preamplifier should be designed to match the characteristic impedance of the transmission line. The noise of the preamplifier associated with the transmission line has a periodic spectrum dependent upon the length of the line with peaks at odd multiples of f' and minima at even multiples of f'. The value of f' is related to the length of the transmission line in accordance with: $f' = v/4L$ where v is the propagation velocity, typically $\frac{2}{3}$ the speed of light, and L is the length of the transmission line.

8 Claims, 2 Drawing Sheets

OPTICAL RECEIVER FOR SUBCARRIER FREQUENCY DIVISION MULTIPLEXING SIGNALS

BACKGROUND OF THE INVENTION

This invention relates to an optical receiver and is particularly concerned with optical receivers for subcarrier frequency division multiplexing signals.

With subcarrier frequency division multiplexing (SC-FDM), the optical power is modulated at several subcarrier frequencies. Each of these subcarrier frequencies is modulated with digital or analog signals. This form of multiplexing is well known as a means of enabling optical fiber to carry many television signals analogous to that used on coaxial cable. However, it is equally applicable to the carriage of many digital signals, where it avoids the necessity of time multiplexing into and demultiplexing out of a single stream having a relatively high bit rate.

Wideband optical receivers are normally characterized by a noise spectrum (referred to the input) which is lowest at low frequencies and rises almost linearly with frequency. When such a receiver is used with an SC-FDM signal set, the signals associated with the lowest frequency carrier enjoy the best signal-to-noise ratio for a given subcarrier modulation depth. Each subsequent carrier is inferior in this sense. One means to avoid this is to weight the modulation depths of the carriers such that the higher frequencies are more heavily modulated.

SUMMARY OF THE INVENTION

An object of the present invention is to provide an improved optical receiver for subcarrier frequency division multiplexing signals.

In accordance with an aspect of the present invention there is provided an optical receiver for subcarrier frequency division multiplexing signals comprising an amplifier having an input and an output, a photodiode, which is reversed biassed, coupled to the input of the amplifier, and a transmission line of predetermined length coupled to the input of the amplifier, the transmission line thereby comprising an open circuit, the predetermined length being selected in dependence upon a subcarrier frequency.

In accordance with another aspect of the present invention there is provided an optical receiver for subcarrier frequency division multiplexing signals comprising a amplifier having an input and an output, a transmission line of predetermined length coupled to the input of the amplifier, a photodiode, which is reversed biassed, coupled to the input of the amplifier via the transmission line, the predetermined length being chosen in dependence upon the subcarrier frequency.

The present invention provides a noise spectrum of the receiver matched to the spectral characteristics of the SC-FDM composite signal set, consisting of carriers equally spaced in frequency.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
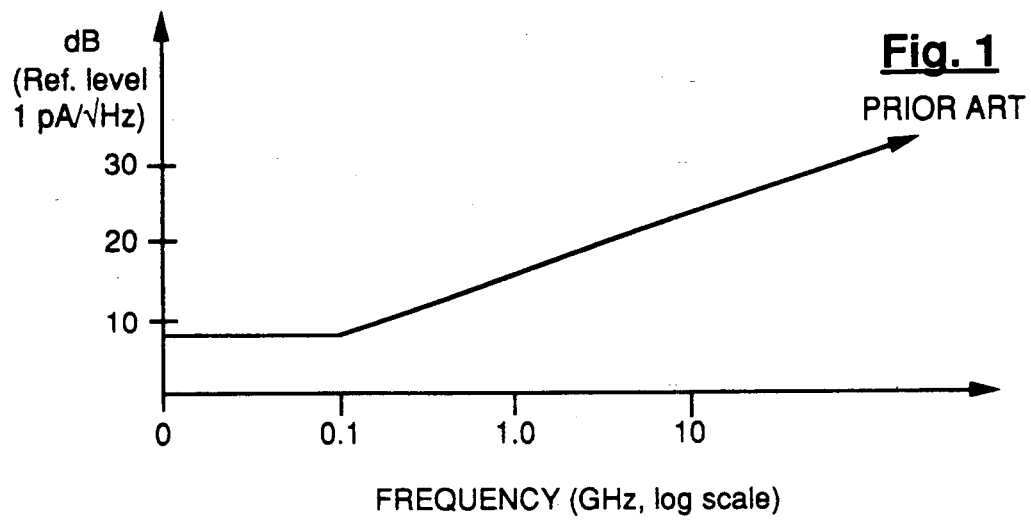
FIG. 1 graphically illustrates the noise spectrum of a typical wideband optical receiver as a function of frequency.

Referring to FIG. 1, there is graphically illustrated the noise spectrum of a typical wideband optical receiver as a function of frequency, as discussed above.

Figure 2:
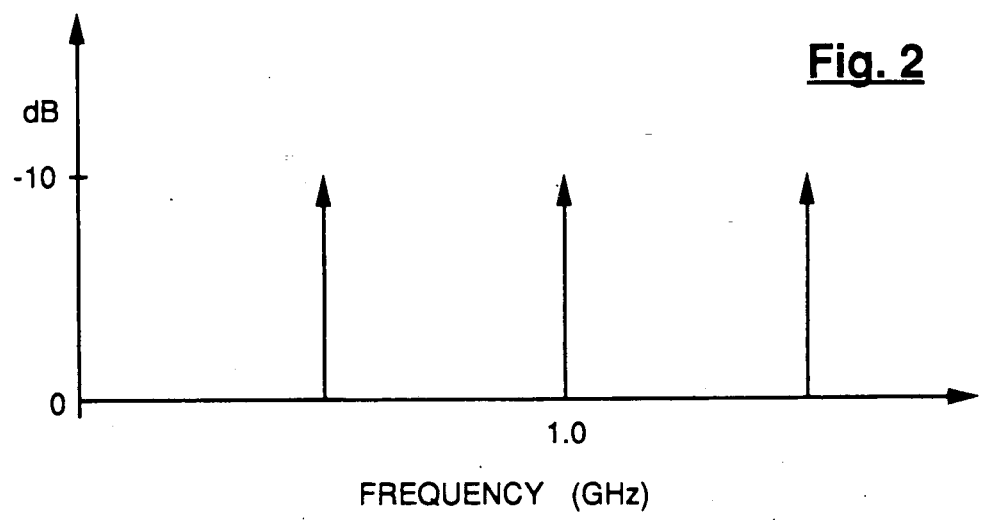
FIG. 2 graphically illustrates subcarrier frequency division multiplexing signals which the present invention is adapted to receive.

FIG. 2 graphically illustrates subcarrier frequency division multiplexing signals which the present invention is adapted to receive. The signals occur at evenly spaced intervals and do not require increasing modulation depth as a function of increasing frequency.

Figure 3:
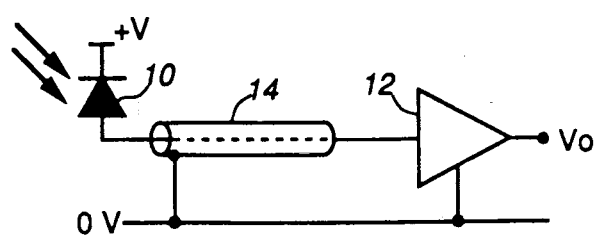
FIG. 3 schematically illustrates an optical receiver in accordance with a first embodiment of the present invention.
Figure 4:
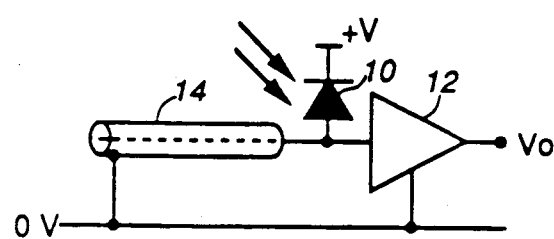
FIG. 4 schematically illustrates an optical receiver in accordance with a second embodiment of the present invention.

Referring to FIG. 3, there is illustrated an optical receiver in accordance with a first embodiment of the present invention. The optical receiver includes a photodiode 10, a preamplifier 12 and a length of transmission line 14. The photodiode 10 is for example an avalanche diode or a p-i-n type silicon photodiode which serves to receive a modulated light signal, as represented by arrows, for example from an optical fiber (not shown) of a communication system. The photodiode 10 may be connected to the preamplifier 12, either via the transmission line 14, as shown in FIG. 3, that is at the remote end of the transmission line 14 or directly between the preamplifier 12 and the transmission line 14, as shown in FIG. 4. In FIG. 4, the transmission line 14 is connected as an open circuit transmission line. In this direct-coupled optical receiver, the photodiode 10 is reversed biased by power supply voltage V+, and the preamplifier 12 produces an output signal voltage Vo representing the modulation signal. The transmission line 14 may comprise a coaxial cable, stripline, or any other form of transmission line suitable for providing a delay as described below.

The input impedance of the preamplifier 12 should be designed to match the characteristic impedance $Z_o$ of the transmission line 14, typically 50 to 100 ohms, to prevent reflections at that location. Such impedance can be achieved best with the aid of an integrating open-loop preamplifier with capacitive feedback of the type described in copending U.S. Pat. application Ser. No. 337,810, the disclosure of which is hereby incorporated by reference.

The input impedance is real and is given by:

$R + 1/(2\pi \text{ GBW } C_f)$ ohms where, GBW is the open loop gain-bandwidth product of the preamplifier and $C_f$ is the feedback capacitance. For example, where GBW = 3 GHz and $C_f = 0.5$ pF, R = 106 ohms.

An advantage of the present invention is providing the correct impedance matching without introducing the thermal noise associated with resistive termination of 50 to 100 ohms. As described in the copending U.S. Pat. application Ser. No. 337,810, the output of such a preamplifier rolls off with the inverse of frequency, and subsequently equalization is required to obtain a response independent of frequency.

Figure 5:
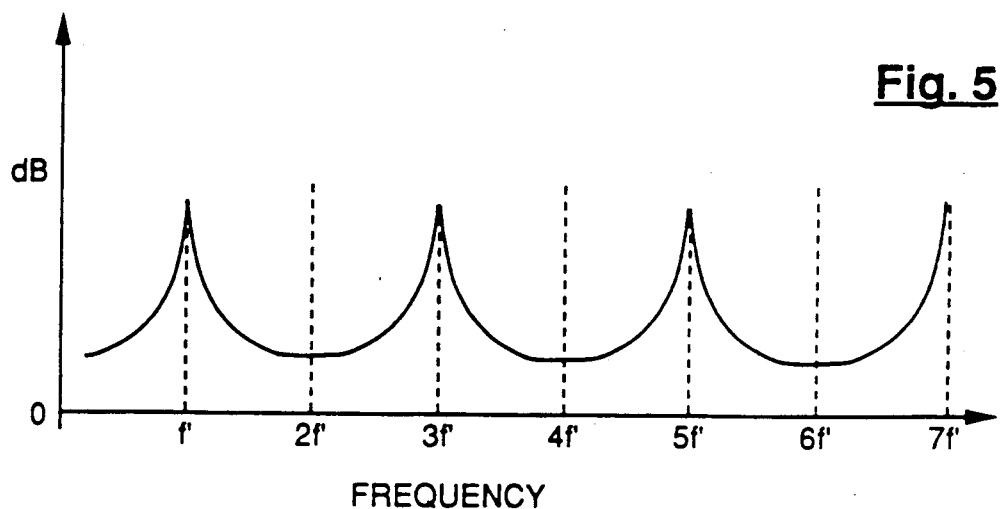
FIG. 5 graphically illustrates the noise spectrum of the optical receiver of FIGS. 3 and 4 as a function of frequency.

The noise of the preamplifier 12 associated with the transmission line 14 has a periodic spectrum dependent upon the length of the line, as graphically illustrated in FIG. 5. Where $E_n$ is the series equivalent noise generator associated with the preamplifier, and $I_n$ is the shunt equivalent noise generator, the noise equivalent photocurrent is given by the vector sum $I_v$:

$$I_v = E_n/(Z_o \text{ cotangent}(\pi f/2f')) + I_n \ A/\sqrt{Hz}$$

This is based upon the impedance of an open-circuited transmission line, as available in standard texts, for example Glazier and Lamount, *Transmission and Propagation*, HMSO 1958. The noise can be seen to fall to a minimum at dc, 2f', and multiples of 2f'. It can be seen to rise to infinity at f' and odd multiples of f'. In practice, the upper limit is set by the amplifier voltage gain and is finite, as illustrated in FIG. 5. The communications system design should be such that the subcarrier frequencies correspond to the 2f' multiples. The high noise occurs midway between the subcarriers and can be filtered out subsequently. The value of f' is related to the length of the transmission line in accordance with: f'=v/4L where v is the propagation velocity, typically ⅔ the speed of light, and L is the length of the transmission line. For example, if the SC-FDM system had subcarriers at 0.5 GHz, 1.0 GHz, 1.5 GHz, ..., then f'=250 MHz and L=approximately 20 cm. In practice, the presence of preamplifier input capacitance and photodiode capacitance modifies, to some extent, the locations of the null frequencies, but not their separation.

The noise spectrum would then be the same around every subcarrier being at a minimum at the subcarrier frequency and rising symmetrically on both sides of the carrier according to:

$$I_v E_n/ Z_o \text{ tangent } 2F/(\pi f') + I_n$$

where F is the frequency difference from the subcarrier. For differences much less than f', the equivalent source capacitance 10 can be shown to be equal to $1/(\pi^2 Z_o f')$.

Numerous modifications, variations and adaptations may be made to the particular embodiments of the invention described above without departing from the scope of the invention, which is defined in the claims.

What is claimed is:

1. An optical receiver for subcarrier frequency division multiplexing signals comprising:
   an amplifier having an input and an output;
   a photodiode, which is reversed biassed, coupled to the input of the amplifier; and
   a transmission line of predetermined length coupled to the input of the amplifier, the transmission line thereby comprising an open circuit;
   the predetermined length being selected in dependence upon a subcarrier frequency.

2. An optical receiver as claimed in claim 1 wherein the predetermined length L is determined from L=v/4f' for the transmission line having a propagation velocity, v, and 2f' is the subcarrier frequency.

3. An optical receiver as claimed in claim 2 wherein the predetermined length L is adjusted to compensate for amplifier input capacitance and photodiode capacitance such that noise spectrum minima approximately coincide with even multiples of f'.

4. An optical receiver as claimed in claim 3 wherein the input impedance of the amplifier approximately matches the impedance of the transmission line.

5. An optical receiver for subcarrier frequency division multiplexing signals comprising:
   an amplifier having an input and an output;
   a transmission line of predetermined length coupled to the input of the amplifier; and
   a photodiode, which is reversed biassed, coupled to the input of the amplifier via the transmission line;
   the predetermined length being chosen in dependence upon the subcarrier frequency.

6. An optical receiver as claimed in claim 5 wherein the predetermined length L is determined from L=v/4f' for the transmission line having a propagation velocity, v, and 2f' is the subcarrier frequency.

7. An optical receiver as claimed in claim 6 wherein the predetermined length L is adjusted to compensate for amplifier input capacitance and photodiode capacitance such that noise spectrum minima approximately coincide with even multiples of f'.

8. An optical receiver as claimed in claim 7 wherein the input impedance of the amplifier approximately matches the impedance of the transmission line.

* * * * *